(12) United States Patent     (10) Patent No.:   US 12,573,957 B2

Potlapalli et al.     (45) Date of Patent:    Mar. 10, 2026

---

(54) CROSS POWER MANAGEMENT INTEGRATED CIRCUIT

(71) Applicant: Renesas Electronics America Inc., Milpitas, CA (US)

(72) Inventors: Yashovardhan Rao Potlapalli, Cary, CA (US); Brian Lee Allen, Holly Springs, NC (US); Mehul Dilip Shah, Cary, NC (US); Akshat Shenoy, Cary, NC (US); Milind Prakash Tile, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 197 days.

(21) Appl. No.: 18/591,596

(22) Filed: Feb. 29, 2024

(65) Prior Publication Data

US 2024/0297588 A1     Sep. 5, 2024

Related U.S. Application Data

(60) Provisional application No. 63/488,461, filed on Mar. 3, 2023.

(51) Int. Cl.
| | |
|---|---|
| *H02M 3/158* | (2006.01) |
| *H02M 1/00* | (2007.01) |
| *H02M 1/32* | (2007.01) |

(52) U.S. Cl.
CPC ....... *H02M 3/1584* (2013.01); *H02M 1/0025* (2021.05); *H02M 1/0032* (2021.05); *H02M 1/327* (2021.05); *H02M 1/0009* (2021.05)

(58) Field of Classification Search
CPC ............. H02M 1/0009; H02M 1/0025; H02M 1/0032; H02M 1/327; H02M 3/1584
See application file for complete search history.

(56) References Cited

U.S. PATENT DOCUMENTS

| | | | |
|---|---|---|---|
| 2017/0207723 A1* | 7/2017 | Zhang | H02M 1/12 |
| 2018/0091055 A1* | 3/2018 | Childs | H02M 3/1582 |
| 2022/0247314 A1* | 8/2022 | Zou | H02J 1/14 |
| 2022/0337162 A1* | 10/2022 | Shen | G06F 1/28 |
| 2023/0353053 A1* | 11/2023 | Ramorini | H02M 3/1584 |

* cited by examiner

*Primary Examiner* — Jue Zhang
(74) *Attorney, Agent, or Firm* — SCULLY, SCOTT, MURPHY & PRESSER, P.C.

(57) ABSTRACT

Systems and methods for power conversion are described. A power converter can operate under low power mode to supply a first load current from a power management integrated circuit (PMIC). The power converter can transition from low power mode to high power mode by one of activating a tri-state mode of the PMIC prior to activating at least one phase in an external power module and operating PMIC and at least one phase of the external power module simultaneously. The external power module and PMIC can be on separate chips. The power converter can operate under high power mode to supply a second load current from the external power module. The second load current can be greater than the first load current. The power converter can transition from high power mode to low power mode by selectively deactivating phases in the external power module prior to activating the PMIC.

20 Claims, 5 Drawing Sheets

400

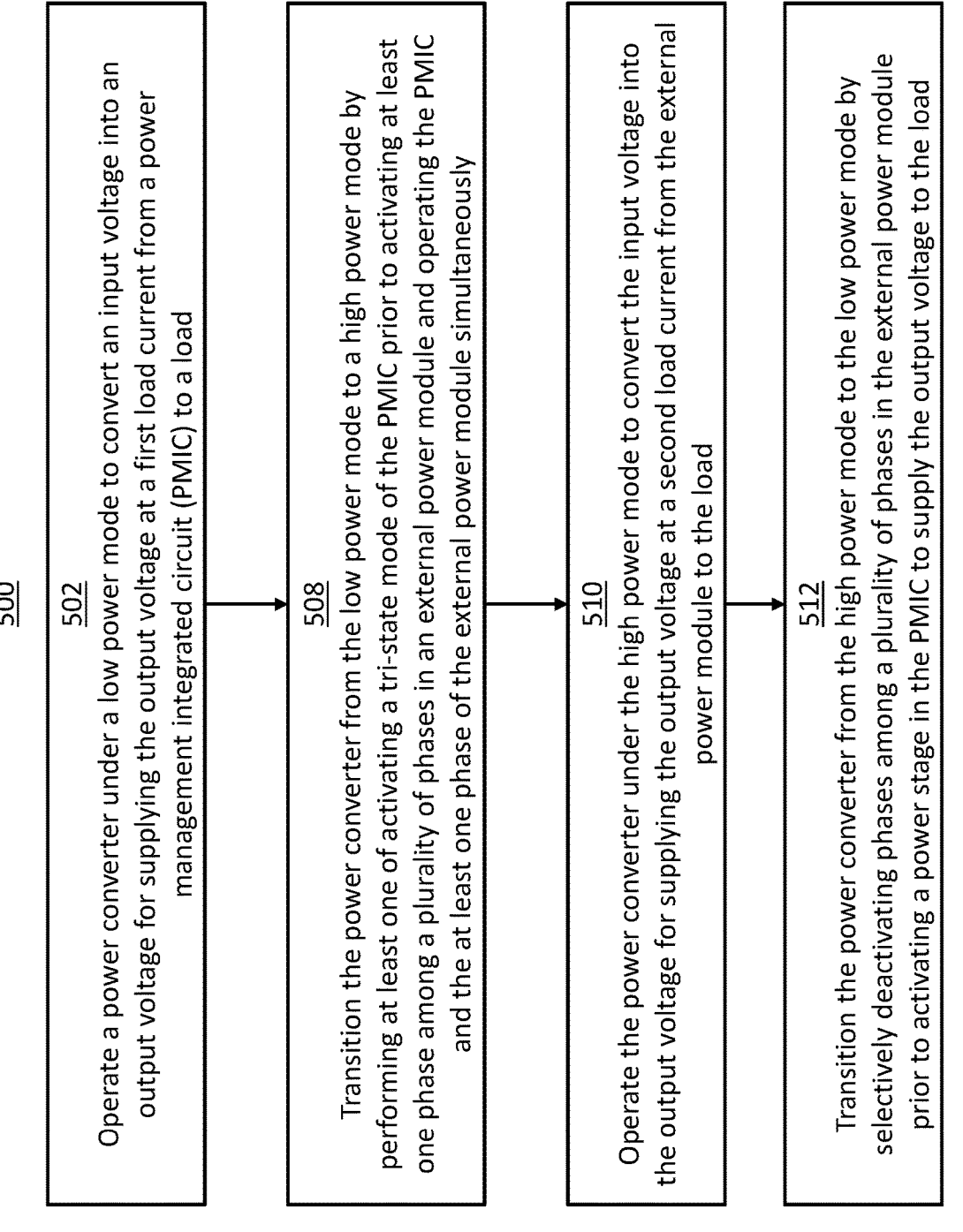

500

502

Operate a power converter under a low power mode to convert an input voltage into an output voltage for supplying the output voltage at a first load current from a power management integrated circuit (PMIC) to a load

508

Transition the power converter from the low power mode to a high power mode by performing at least one of activating a tri-state mode of the PMIC prior to activating at least one phase among a plurality of phases in an external power module and operating the PMIC and the at least one phase of the external power module simultaneously

510

Operate the power converter under the high power mode to convert the input voltage into the output voltage for supplying the output voltage at a second load current from the external power module to the load

512

Transition the power converter from the high power mode to the low power mode by selectively deactivating phases among a plurality of phases in the external power module prior to activating a power stage in the PMIC to supply the output voltage to the load

Fig. 5

CROSS POWER MANAGEMENT INTEGRATED CIRCUIT

CROSS-REFERENCE TO RELATED APPLICATION

This application is based upon and claims the benefit of priority under 35 U.S.C. 119(e) to U.S. Patent Application No. 63/488,461 filed on Mar. 3, 2023, and titled "CROSS POWER MANAGEMENT INTEGRATED CIRCUIT (XPMIC) BABY PHASE ARCHITECTURE," the entire disclosure of which is incorporated herein by reference in its entirety.

BACKGROUND

Unless otherwise indicated herein, the materials described in this section are not prior art to the claims in this application and are not admitted to be prior art by inclusion in this section. The present disclosure relates in general to systems and methods of controlling semiconductor devices, more particularly, to control of a power converter.

Power converters or voltage converters, such as buck converters and boost converters, can be used for converting an input voltage to an output voltage having a different voltage level. A buck converter, or step-down converter, can convert the input voltage into a lower voltage. A boost converter, or step-up converter, can convert the input voltage into a higher voltage. A buck-boost converter can step up or step down the input voltage. A voltage converter can include multiple switches that can be turned on and off by a pulse width modulated (PWM) control signal. A duty cycle of the PWM control signal can determine an output voltage of the voltage converter. When the voltage converter is connected to a load, the load can demand a specific amount of power and the voltage converter can perform the voltage conversion to generate the output voltage that can deliver the power demanded by the load.

SUMMARY

In one embodiment, a system for power conversion can be generally described. The system can include an external power module comprising a plurality of phases. Each one of the phases can include a first power stage configured to convert an input voltage into an output voltage. The system can further include a power management integrated circuit (PMIC). The PMIC can include a second power stage configured to convert the input voltage into the output voltage. The PMIC can further include a controller configured to operate the system in a high power mode to supply the output voltage at a first load current from the external power module to a load. The controller can be further configured to operate the system in a low power mode to supply the output voltage at a second load current from the PMIC to the load. The second load current can be less than the first load current. The controller can be further configured to transition from the high power mode to the low power mode by selectively deactivating phases among the plurality of phases in the external power module prior to activating the second power stage in the PMIC to supply the output voltage under the second load current. The controller can be further configured to transition from the low power mode to the high power mode by performing at least one of activate a tri-state mode of the PMIC prior to activating at least one phase among the plurality of phases in the external power module and operate the PMIC and the at least one phase of the external power module simultaneously.

In one embodiment, a semiconductor device for power conversion is generally described. The semiconductor device can include a first power stage configured to convert an input voltage into an output voltage. The semiconductor device can further include a controller configured to perform power conversion in a low power mode to supply the output voltage at a first load current from the first power stage to a load. The controller can be further configured to perform power conversion in a high power mode to supply the output voltage at a second load current from an external power module to the load. The external power module can include a plurality of phases, and each one of the phases comprises a second power stage can be configured to convert the input voltage into the output voltage. The second load current can be less than the first load current. The controller can be further configured to transition from the high power mode to the low power mode by selectively deactivating phases among the plurality of phases in the external power module prior to activating the first power stage in the PMIC to supply the output voltage to the load. The controller can be further configured to transition from the low power mode to the high power mode by performing at least one of activate a tri-state mode of the PMIC prior to activating at least one phase among the plurality of phases in the external power module and operate the PMIC and the at least one phase of the external power module simultaneously.

In one embodiment, a method for operating a power converter is generally described. The method can include operating the power converter under a low power mode to convert an input voltage into an output voltage for supplying the output voltage at a first load current from a power management integrated circuit (PMIC) to a load. The method can further include transitioning the power converter from the low power mode to a high power mode by performing at least one of activating a tri-state mode of the PMIC prior to activating at least one phase among a plurality of phases in an external power module, where the external power module and the PMIC can be on separate chips, and operating the PMIC and the at least one phase of the external power module simultaneously. The method can further include operating the power converter under the high power mode to convert the input voltage into the output voltage for supplying the output voltage at a second load current from the external power module to the load, where the second load current can be less than the first load current. The method can further include transitioning the power converter from the high power mode to the low power mode by selectively deactivating phases among a plurality of phases in the external power module prior to activating a power stage in the PMIC to supply the output voltage to the load.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 5 is another flow diagram illustrating a process to implement cross power management integrated circuit in one embodiment.

DETAILED DESCRIPTION

Figure 1:
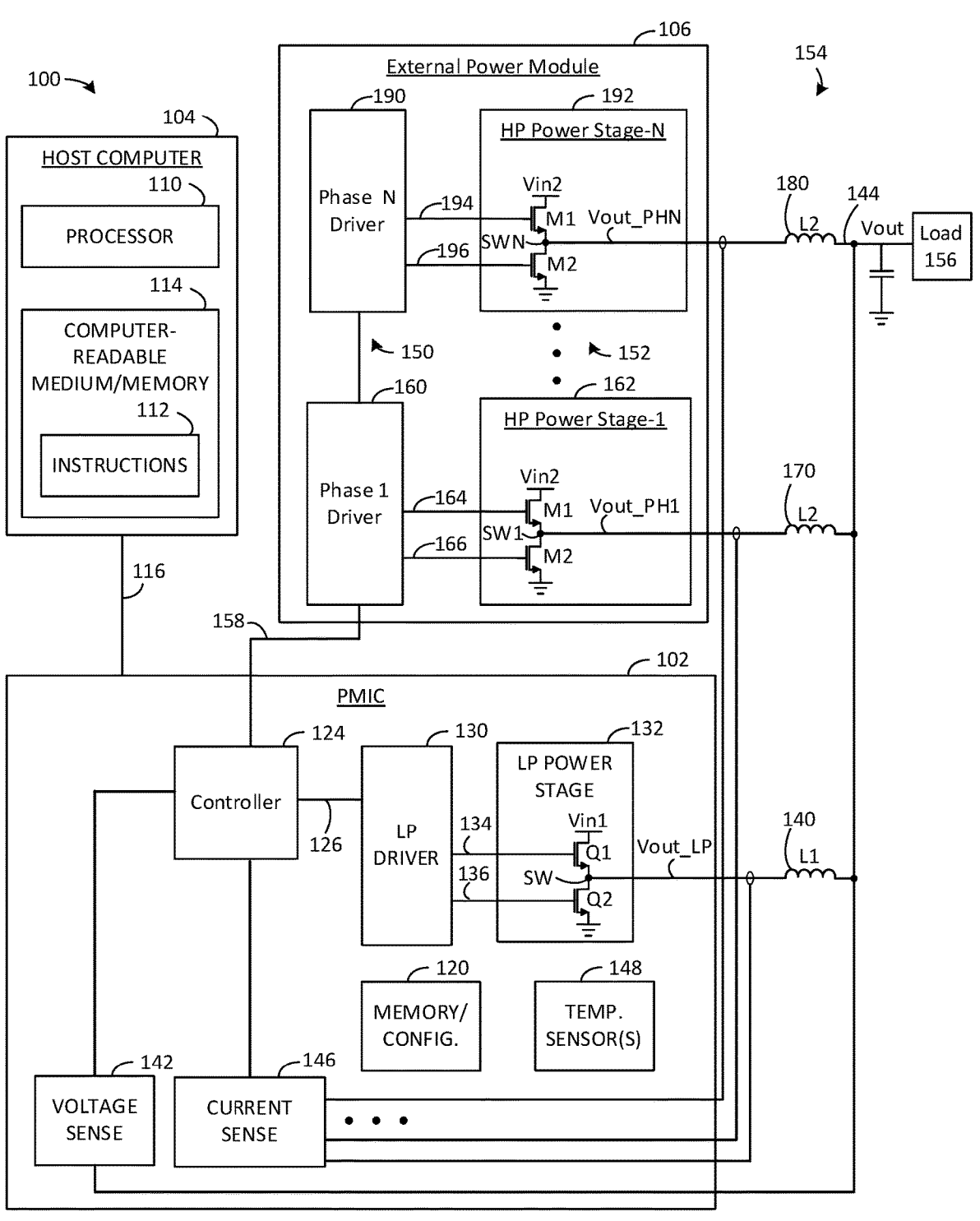
FIG. 1 illustrates an example of a system that can implement cross power management integrated circuit in one embodiment.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

A power converter can include power devices, such as field-effect transistors (FETs), that can be switched to generate output voltages for supplying power to a load. A controller of the power converter can include modulators configured to generate pulse-width-modulation (PWM) signals. The power converter can also include driver circuits that can receive the PWM signals and generate voltage signals using the PWM signals. The driver circuits can drive the power devices by applying the voltage signals to the gate terminals of the power devices to switch the power devices on and off. In an aspect, input voltage being provided to the power converter can have a voltage that is higher than the voltage of the power being demanded by the load. The power converter, which can be a buck converter, can step down the input voltage to generate an output voltage that has a voltage level being demanded by the load.

In an aspect, a power converter can be connected to different loads that demand different levels of power. A heavy load can demand relatively more power or larger load current and a light load can demand relatively less power or lower load current. The power converter can be designed and configured to supply different levels of power or load current to accommodate heavy and light loads. The switching of the power devices can be controlled for the power converter to supply different amount of power to different loads. In an aspect, if a power converter is designed to be efficient at light loads, the efficiency at heavy load operation may be impacted and conversely for heavier load optimization, the light load efficiency may be impacted. If a power converter can be designed to switch between different power stages, during different loading optimal efficiency performance can be achieved.

For example, the power converter can include multiple phases, where a phase is a power stage (e.g., power FETs connected to an inductor). The multiple power stages can be connected in parallel to deliver different levels of power or load current, and also high power for heavy loads, in a relatively efficient manner. The controller of the power converter can manage the number of active phases based on the load to make the power conversion as efficient as possible. For example, the controller can activate more phases to supply power to a heavy load, and an activate fewer phases, or even only one phase, to supply power to a light load. In an aspect, power converter that can supply both heavy and light loads can include power devices or power FETs that may have more power capability, such as being larger, having more power capacity, having higher voltage. Hence, the efficiency of such power converters may not be optimal when supplying light loads because the power devices with more power capabilities may require relatively more quiescent current to be powered up and switched.

To be described in more detail below, a power conversion system can include a power stage integrated in a power management integrated circuit (PMIC) and an external power stage that is outside of the PMIC. A controller can operate the power conversion system under a low power mode by switching power stage in the PMIC to supply Vout to light loads at lower load current. The controller can also operate the power conversion system under a high power mode by switching external power stage to supply Vout to heavy loads at larger load current. The controller can also switch between the high power mode and the low power mode in a seamless manner such that entry to and exit from the low power mode would not disturb operations of the power conversion system, removes between the high power mode and the low power mode, and protects the power stage in the PMIC from excessive power draw or destruction. In some examples, the power stage integrated in the PMIC for low power mode can be referred to as a baby phase.

FIG. 1 illustrates an example of a system 100 that can implement cross power management integrated circuit (XPMIC) in one embodiment. System 100 can be a power converter system 100, according to a non-limiting example. As used herein, the terms block, module, circuit, system and the like may refer to various hardware, firmware, and software elements, or a combination thereof.

System 100 can include a PMIC 102, a host computer 104 and an external power module 106. PMIC 102 can be a cross power management integrated circuit (XPMIC), alternatively referenced as XPMIC or Cross-PMIC, that can be configured to provide a low power output at lower load current for power converter system 100. Host computer 104 can be configured to provide control to and receive status from PMIC 102. External power module 106 can be configured to provide high power output at higher load current from a plurality of power stages. PMIC 102 can be configured to provide control signals to and receive current signals and voltage signals from external power module 106.

PMIC 102 can include at least a controller 124, a plurality of storage or memory locations 120 (e.g., addresses), a driver circuit (or LP driver) 130, a power stage 132 (or LP power stage 132) and other components such as temperature sensors 148. Memory locations 120 can include, for example, configuration registers, control registers, and status registers to store instructions, configuration data, and retain status for communication with host computer 104. Controller 124 can include one or more semiconductor devices implementing, for example, a microcontroller including hardware such as various analog and digital circuit components. Controller 124 can include, for example, a processor, central processing unit (CPU), field-programmable gate array (FPGA) or any other circuitry that is configured to control and operate various aspects of power stages 152. Controller 124 be configured to control various aspects of PMIC 102. Power stage 132 can be included on the same die as controller 124 (e.g., integrated into the same semiconductor chip).

Controller 124 can be configured to execute instructions that may include firmware, software, and configuration data that may be embedded in or accessible by memory 120 or may be at least partially downloaded from host computer 104. Controller 124 can be further configured to generate control signals 126 (e.g., PWM signals) for turning on and turning off switches in power stage 132 and send control signals 126 to driver circuit 130. Driver circuit 130 can receive the control signals and convert the control signals into drive signals that can be gate voltages for driving switches in power stage 132. Controller 124 can be further configured to monitor various parameters relating to operations in system 100 and based on the monitored parameters, determine whether to operate system 100 under a high power mode or a low power mode to supply different levels of power to one or more loads, such as a load 156.

Power stage 132 can include at least a pair of switches Q1, Q2. Switches Q1, Q2 can be, for example, metal oxide field effect transistors (MOSFETS). Switch Q1 can be arranged serially between an input voltage Vin1 and a switch node SW. In one embodiment, input voltage Vin1 can be a direct current (DC) voltage provided by a battery or a power supply. Switch Q2 can be arranged serially between switch node SW and ground. Each one of switches Q1, Q2 can be an N-type (e.g., N channel) MOSFET or a P-type (e.g., P channel) MOSFET. Driver circuit 130 can use control signals 126 to generate a drive signal 134 and use drive signal 134 to drive switch Q1, and to generate a drive signal 136 and use drive signal 136 to drive switch Q2. Driver circuit 130 can apply drive signals 134, 136 to gate terminals of switches Q1, Q2, alternately according to PWM control signals provided by controller 124. As a result of driving switches Q1, Q2 using drive signals 134, 136, an output voltage Vout_PH can be outputted from switch node SW. An inductor 140 having inductance L1 can be connected between switch node SW and output 144 of system 100. An output voltage Vout from output 144 can supply power to load 156. Load 156 can be, for example, a central processing unit (CPU), a multiprocessor unit (MPU), a computer, or other electronic components that requires power to operate.

Temperature sensors 148 can be configured to sense an ambient temperature of PMIC 102. If the ambient temperature of PMIC 102 is relatively high, such as being greater than a predefined temperature threshold (e.g., the die temperature is above 85 C°, 185° F.), then temperature sensors 148 can output a flag (e.g., as an analog or digital signal) to controller 124. In response to receiving the flag, controller 124 can determine that PMIC 102 may be exposed to excessive heat and suspend or disable PMIC 102 to present damaging PMIC 102 and/or other components of system 100. Other temperature thresholds may be imposed, and the threshold may be adjusted based on various operating and environmental conditions of system 100.

PMIC 102 can also include a voltage sensing circuit 142 configured to receive a feedback of output voltage Vout from output 144 and can output flags (e.g., analog or digital signals) to controller 124 indicating whether Vout is greater than, less than, or equal to, at least one predefined voltage thresholds. Controller 124 can use the flags from voltage sensing circuit 142 to operate various aspects of system 100. PMIC 102 can also include a current sensing circuit 146 configured to receive a feedback of inductor current across inductors in system 100, such as inductors 140, 170, 180. Current sensing circuit 146 can output flags (e.g., analog or digital signals) to controller 124 indicating whether the sensed inductor current is greater than, less than, or equal to, at least one predefined inductor current thresholds. Controller 124 can use the flags from current sensing circuit 146 to operate various aspects of system 100. In one embodiment, current sensing circuit 146 can be connected to inductors in system 100 using non-lossy connections, such as an inductive pickup sensor connection.

Host computer 104 can include a microcontroller or microcomputer having a processor 110 configured to read and execute computer instructions 112 (e.g., computer implemented code) stored on a non-transitory computer-readable medium 114 such as a read-only memory (ROM), a random access memory (RAM), a programmable logic device (PLD), a flash drive, a memory card/stick, a solid-state storage device, or the like which may be re-writable, removable, or replaceable to facilitate revision and/or update of computer instructions 112. Host computer 104 can communicate with PMIC 102 over a bidirectional bus 116.

External power module 106 can include a plurality of driver circuits 150 and a plurality of power stages 152 ("HP power stage"). Driver circuits 150 can receive control signals 158 from controller 124 in PMIC 102 and use control signals 158 to generate drive signals that can be gate voltages for driving switches in power stages 152. Each one or power stages 152 can include at least a pair of switches M1, M2. Switches M1, M2 can be, for example, MOSFETS. Switch M1 can be arranged serially between an input voltage Vin2 and a switch node and switch M2 can be arranged serially between switch node SW and ground. Each one of switches M1, M2 can be an N-type MOSFET or a P-type MOSFET. In one embodiment, input voltage Vin2 can be a direct current (DC) voltage provided by a battery or a power supply. In one embodiment, the input voltage Vin2 being provided to external power module 106 can be the same as the input voltage Vin1 bring provided to PMIC 102 (e.g., same voltage source). In another embodiment, Vin2 can be different from Vin1, such as Vin2 can be greater than input voltage Vin1 being provided to power stage 132 in PMIC 102. By way of example, Vin1 can be 5 volts (V) and Vin2 can be 10V to 100V.

In the embodiment shown in FIG. 1, there are N phases such that there are N driver circuits 150 and N power stages 152. Using one of the N phases shown in FIG. 1 as an example, Phase 1 can include a driver circuit 160 and a power stage 162. Driver circuit 160 can use control signals 158 to generate a drive signal 164 and use drive signal 164 to drive switch M1 in power stage 162, and can generate a drive signal 166 and use drive signal 166 to drive switch M2 in power stage 162. Driver circuit 160 can apply drive signals 164, 166 to gate terminals of switches M1, M2, alternately according to PWM control signals provided by controller 124. As a result of driving switches M1, M2 using drive signals 164, 166, an output voltage Vout_PHI can be outputted from a switch node SW1 between switches M1, M2. An inductor 170 having inductance L2 can be connected between switch node SW1 and output 144 of system 100.

In one embodiment, each phase among the plurality of phases in external power module 106 can be identical. Using Phase N in FIG. 1 as an example, Phase N can include a driver circuit 190 and a power stage 192. Driver circuit 190 can use control signals 158 to generate a drive signal 194 and use drive signal 194 to drive switch M1 in power stage 192, and can generate a drive signal 196 and use drive signal 196 to drive switch M2 in power stage 192. Driver circuit 190 can apply drive signals 194, 196 to gate terminals of switches M1, M2, alternately according to PWM control signals provided by controller 124. As a result of driving switches M1, M2 using drive signals 194, 196, an output voltage Vout_PHN can be outputted from a switch node SWN between switches M1, M2. An inductor 180 having inductance L2 can be connected between switch node SWN and output 144 of system 100.

In one embodiment, switches Q1, Q2 in power stage 132 of PMIC 102 can be smaller and capable of controlling lower power when compared to switches M1, M2 in power stages 152 of external power module 106. In other words, switches M1, M2 can be larger and capable of controlling higher power when compared to switches Q1, Q2. In one embodiment, inductance L1 can be different from inductance L2, and inductor 140 can have different footprint, different power handing capability, and different space requirement when compared to inductors connected between external power module 106 and output 144, such as inductors 170, 180. The value of inductance and inductor footprint of L1, L2 may be chosen based on an objective to optimize efficiency of system 100. By way of example, L1 can be 470 nanohenries (nH) and L2 can be 110 nH. In one embodiment, the number of phases in external power module 106 can depend on the intended power delivery capabilities of system 100. The number of phases in external power module 106 can vary from 1 to N, where N may be 1, 1, 4, 10, 16, or any number based on the power delivery requirements of system 100.

To be described in more detail below, controller 124 can be configured to switch operation mode of system 100 between high power mode and low power mode (e.g., baby phase mode) to output different load current for supplying different levels of power. Controller 124 can monitor signals on directional bus 116, where these monitored signals can encode commands and/or instructions indicating whether controller 124 shall switch operation mode of system 100. Controller 124 can switch operation mode of system 100 by selectively activating and deactivating external power module 106 and power stage 132, and also selectively activating and deactivating power stages 152 in external power module 106. The selective activation and deactivation can provide seamless switch between operation modes such that power supply provided by Vout will not be interrupted. Further, controller 124 can switch operation modes based on ambient temperature of PMIC 102 to prevent damaging PMIC 102.

Figure 2:
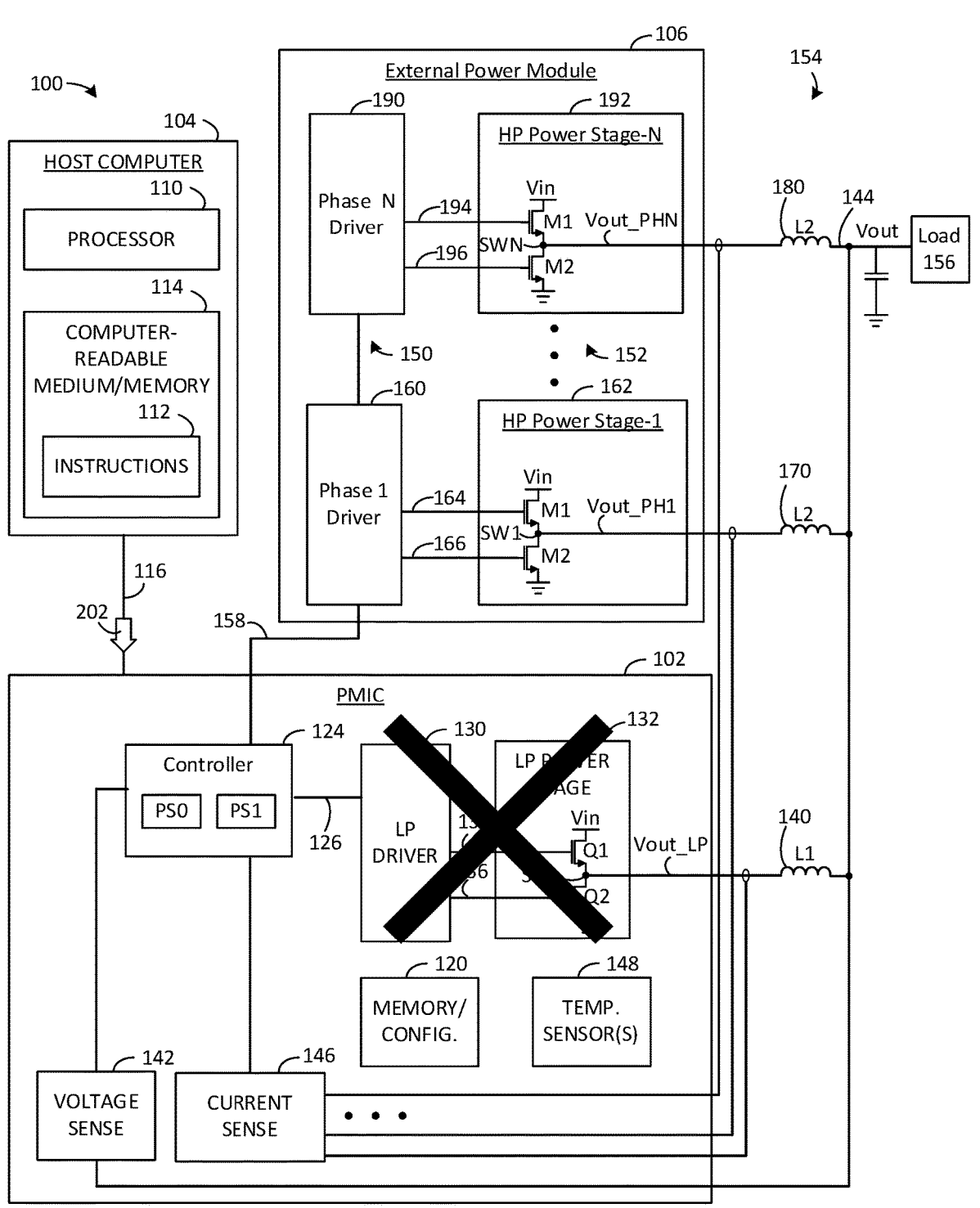
FIG. 2 illustrates an example implementation of the system in FIG. 1 in one embodiment.

FIG. 2 illustrates an example implementation of the system in FIG. 1 in one embodiment. In the embodiment shown in FIG. 2, controller 124 can operate system 100 under a high power mode by deactivating power stage 132 and activating external power module 106. In one embodiment, controller 124 can deactivate power stage 132 by disconnecting driver circuit 130 from controller 124, or by not providing control signals 126 (e.g., not applying voltage) on a signal trace connecting controller 124 to driver circuit 130. In one embodiment, controller 124 can activate external power module 106 by connecting at least one driver circuit among driver circuits 150 to controller 124, or by providing control signals 158 (e.g., applying voltage) on a signal trace connecting controller 124 to at least one driver circuit among driver circuits 150 in external power module 106.

In one embodiment, host computer 104 can send a command 202 to controller 124 via directional bus 116. Command 202 can indicate a need to operate system 100 under high power mode. In one embodiment, command 202 can be a request to exit low power mode in response to events such as when the amount of power demand by load 156 connected to output 144 is greater than the amount of power that the low power mode can support. In another embodiment, command 202 can be a request to wake up system 100 from various modes such as from shut down, sleep mode, idle mode, or other modes that does not generate Vout at output 144. Note that to wake up system 100, high power mode may be required since the output voltage Vout may need to be ramped up to generate a relatively large current to charge output capacitors (not shown) connected between one or more of the output inductors (e.g., 140, 170, 180) and output 144.

In another embodiment, controller 124 can monitor flags being outputted by voltage sensing circuit 142, current sensing circuit 146 and temperature sensors 148. In one embodiment, if voltage sensing circuit 142 outputs a flag indicating Vout has exceeded a predefined voltage threshold, then controller 124 can determine that power being demanded by load 156 connected to output 144 is increasing that system 100 needs to be operated in high power mode. In another embodiment, if current sensing circuit 146 outputs a flag indicating the inductor current across inductor 140 has exceeded a predefined inductor current threshold, then controller 124 can determine that power being demanded by load 156 connected to output 144 is increasing that system 100 needs to be operated in high power mode. In another embodiment, if temperature sensors 148 outputs a flag indicating the ambient temperature of PMIC 102 exceeds a predefined temperature threshold (e.g., PMIC 102 is considered hot), then controller 124 can determine that power stage 132 shall be deactivated to prevent damaging PMIC 102 and external power module 106 shall be activated to continue supplying power to load 156 connected to output 144.

In one embodiment, the high power mode of system 100 can be categorized into more than one power states. In the present disclosure, a power state PS0 can refer to a full performance where system 100 is operated to supply maximum power to load 156 connected to output 144, and a power state PS1 can refer to light throttling where the power being supplied to load 156 is lower than the power state PS0 but higher than a maximum power that can be supplied by power stage 132 (e.g., higher than a maximum power output of the low power mode). In one embodiment, command 202 provided by host computer 104 to command controller 124 to operate system 100 in high power mode can indicate one of power state PS0 and PS1. In an aspect, as load 156 demands more power, the voltage level Vout can be maintained and external power module 106 can selectively switch active phases among the N phases to ramp up the load current.

Figure 3:
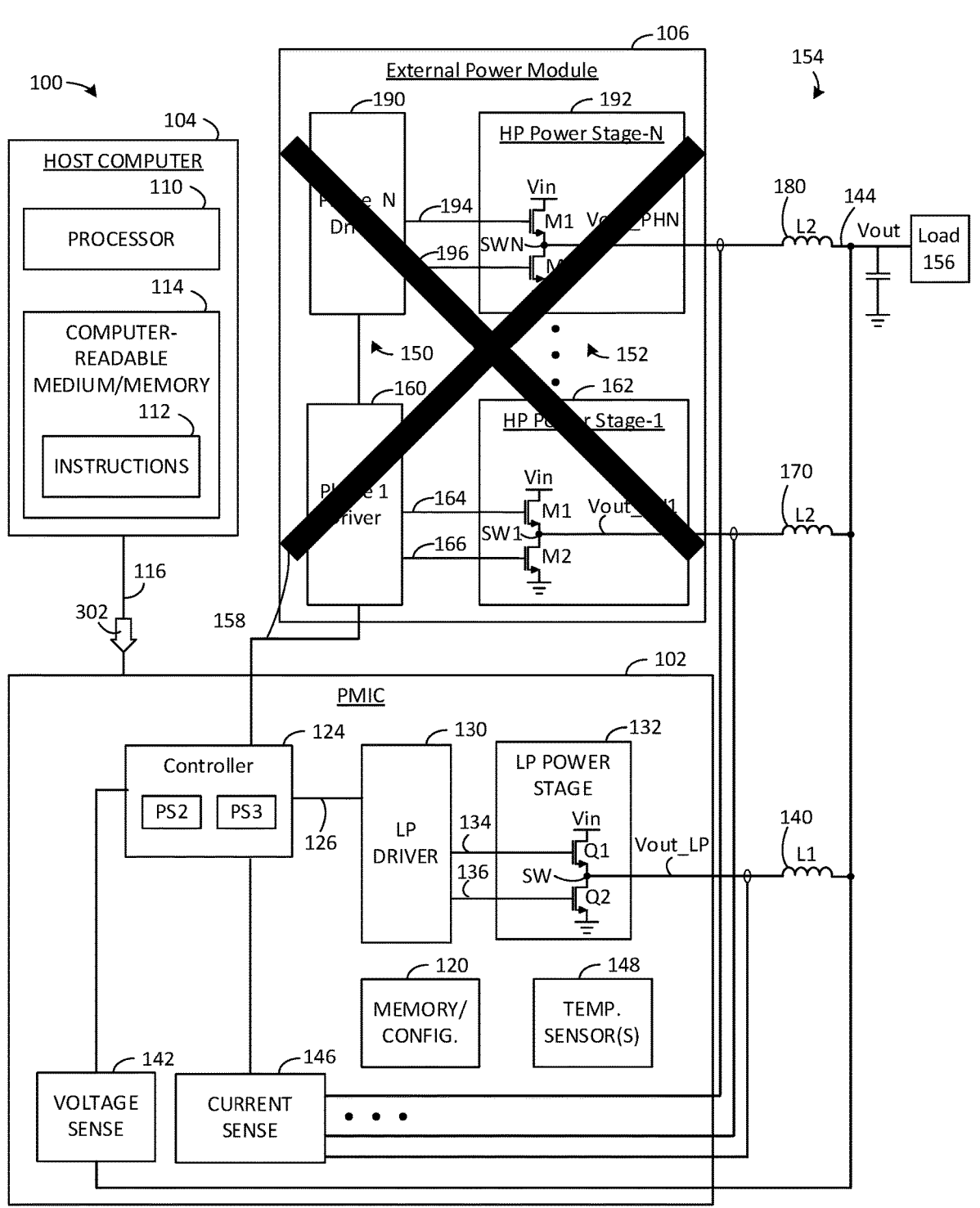
FIG. 3 illustrates another example implementation of the system in FIG. 1 in one embodiment.

FIG. 3 illustrates another example implementation of the system in FIG. 1 in one embodiment. In the embodiment shown in FIG. 3, controller 124 can operate system 100 under a low power mode by deactivating external power module 106 and activating power stage 132. In one embodiment, controller 124 can deactivate external power module 106 by disconnecting external power module 106 from controller 124, or by not providing control signals 158 (e.g., not applying voltage) on a signal trace connecting controller 124 to external power module 106. In one embodiment, controller 124 can activate power stage 132 by connecting to driver circuit 130, or by providing control signals 126 (e.g., applying voltage) on a signal trace connecting controller 124 to driver circuit 130.

In one embodiment, host computer 104 can send a command 302 to controller 124 via directional bus 116. Command 302 can indicate a need to operate system 100 under low power mode. In one embodiment, command 302 can be a request to exit high power mode in response to events such as when the amount of power demand by load 156 connected to output 144 is less than a minimum amount of power that can be supplied by external power module 106. By way of example, the minimum amount of power that can be supplied by external power module 106 can be when one phase is activated in external power module 106 (e.g., 1-phase mode or 1-PH mode).

In another embodiment, in response to receiving command 302 indicating a request to operate system 100 in low power mode, controller 124 can detect whether any flags are received from temperature sensors 148. If no flags are received from temperature sensors 148, controller 124 can operate system 100 in low power mode using power stage 132. If flags are received from temperature sensors 148 indicating PMIC 102 is hot, then controller 124 may not activate power stage 132 despite the request for low power mode indicated by command 302.

In one embodiment, to transition from high power mode into low power mode, controller 124 can transition into low power mode using a slow path where phases in external power module 106 are dropped, or deactivated, one at a time. By way of example, if three phases Phase 1, Phase 2, Phase 3 were activated in high power mode, controller 124 can deactivate Phase 3 in a first cycle and deactivate Phase 2 in a second cycle to transition system 100 into 1-PH mode. In response to system 100 operating under the 1-PH mode, controller 124 can check whether there are flags being received from temperature sensors 148 before deactivating Phase 1 and activating power stage 132. If flags are received from temperature sensors 148, then controller 124 can continue to operate system 100 under 1-PH mode until the ambient temperature of PMIC 102 returns to a safe level (e.g., less than predefined temperature threshold). In one embodiment, if no flags are received from temperature sensors 148, then controller 124 can deactivate Phase 1 and activate power stage 132. In one embodiment, to transition from high power mode into low power mode, controller 124 can transition into low power mode using a fast path where all phases in external power module 106 are dropped or deactivated.

In another embodiment, if the power demanded by load 156 is increasing, controller 124 can activate one additional phase in external power module 106 until the power demand decreases. Similarly, if the power demanded by load 156 is decreasing, controller 124 can deactivate one phase in external power module 106 until the power demand increases. Therefore, when the power demand by load 156 is unstable (e.g., alternately increasing and decreasing between consecutive cycles), controller 124 can also continue to alternately increase and decrease the activated phases external power module 106. If the alternately increasing and decreasing of power demand crosses a predefined power demand threshold that distinguishes power demand between high power mode and low power mode, then controller 124 may be activating and deactivating PMIC 102 continuously and may increase the ambient temperature of PMIC 102, which increases risk of damaging PMIC 102. In one embodiment, to prevent excessively activating and deactivating PMIC 102 continuously under unstable operating conditions of system 100, controller 124 can wait for a predefined timer to lapse before deactivating external power module 106 and activating power stage 132. The wait for the predefined timer to lapse can ensure that system 100 is stabilized before transitioning into low power mode.

In one embodiment, the low power mode of system 100 can be categorized into more than one power states. In the present disclosure, a power state PS2 can refer to a heavy throttling where the voltage level Vout is lower than the maximum voltage that can be generated by power stage 132 (e.g., lower than a maximum voltage output of the low power mode) and higher than a voltage output of a non-operating rapid recovery mode of system 100. The non-operating rapid recovery mode of system 100 can be an immediate transition from high power mode to low power mode. A power state PS3 can refer to operations under the non-operating rapid recovery mode of system 100, where the voltage level Vout is lower than the voltage output of power state PS2 but greater than zero. In one embodiment, system 100 can also be in a power state PS4 that refers to operations under a non-operating slow recovery mode of system 100. The non-operating slow recovery mode of system 100 can be an automatic transition into the lower power mode that is a slower transition than the non-operating rapid recovery mode. Under the non-operating slow recovery mode, both power stage 132 and external power module 106 can be deactivated such that system 100 can be shut down. Note that under the low power mode of system 100, external power module 106 can still supply Vout at relatively high voltage levels as the power being delivered to load 156 is dependent on the load demand. For example, the slow path mentioned above to transition into the 1-PH mode allows external power module 106 to maintain activated and contribute to low power mode.

In another embodiment, the controller can perform an auto entry mechanism to transition into low power mode. By way of example, when the current being drawn by load 156 is less than half of the ripple current, the controller can go into discontinuous conduction mode (DCM) where the controller can switch power stage 132 in a pattern of high-side (e.g., Q1), low side (e.g., Q2), tri-state and the switching frequency can be equivalent to a product of the continuous-conduction-mode (CCM) frequency and a ratio of load 156 current to half of the ripple current (e.g., CCM frequency× (load current/half of ripple current)). Therefore, if controller has access to the CCM frequency (which may be stored in as register setting per application needs), Vin1, Vout from switch node SW, inductance L1 of inductor 140, and DCM frequency (which may be measured using on-chip clock), the controller can determine the load current (e.g., current being drawn by load 156) and enter DCM when the load current is estimated to be less than a maximum current that can be supported by the low power mode.

Figure 4:
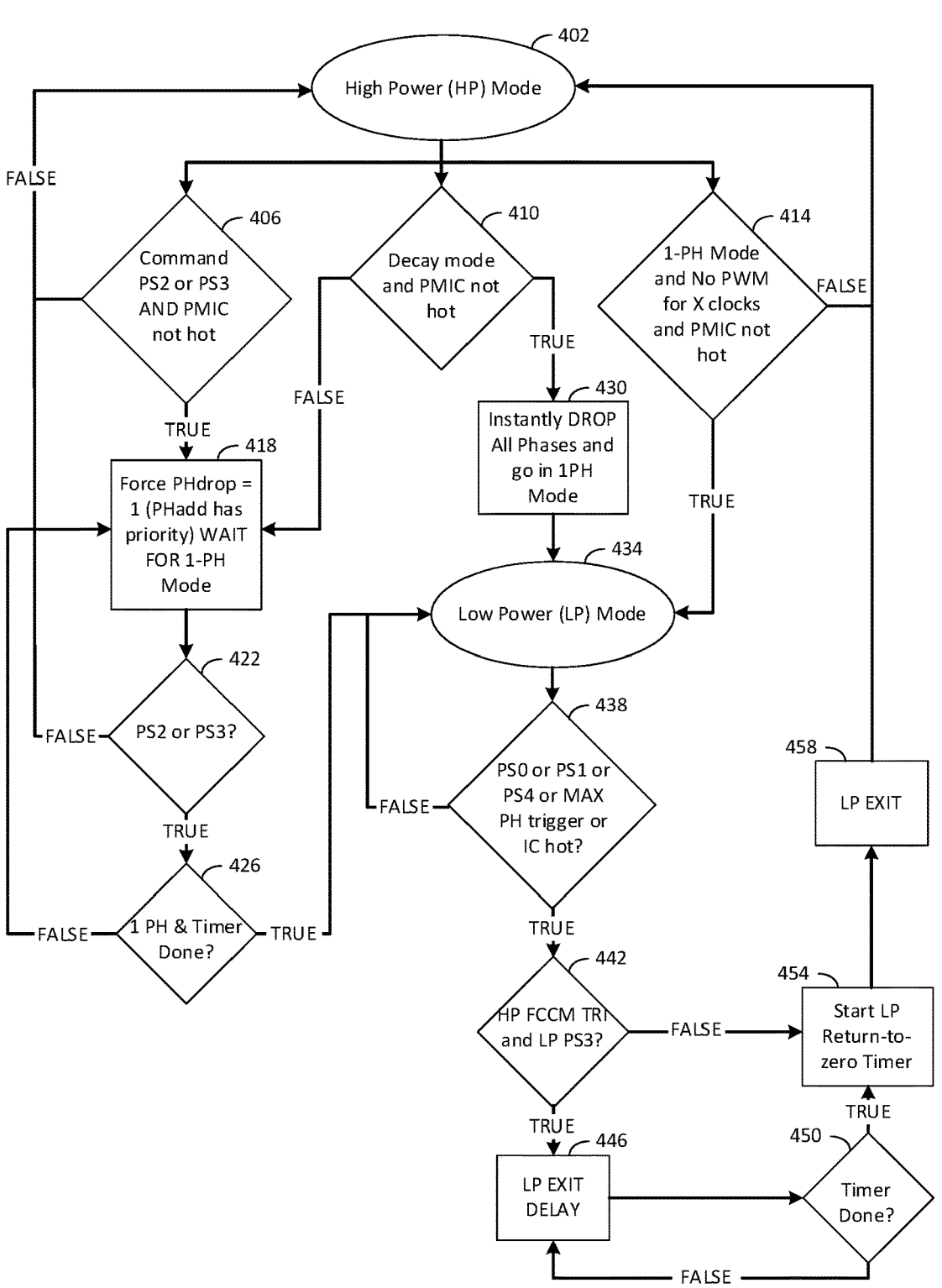
FIG. 4 is a flow diagram illustrating a process to implement cross power management integrated circuit in one embodiment.

FIG. 4 is a flow diagram illustrating a process 400 to implement cross power management integrated circuit in one embodiment. The process can include one or more operations, actions, or functions as illustrated by one or more of blocks shown in FIG. 4. Although illustrated as discrete blocks, various blocks can be divided into additional blocks, combined into fewer blocks, eliminated, performed in different order, or performed in parallel, depending on the desired implementation.

Process 400 can be performed by a controller in a power conversion system, such as controller 124 of system 100 described herein. In one embodiment, process 400 can include operations for a fast entry mechanism to enter low power mode, where this fast entry mechanism can be an alternative to the auto entry mechanism mentioned above with respect to FIG. 3. Descriptions of FIG. 4 can reference components that are shown in FIG. 1 to FIG. 3. Process 400 can begin at block 402. At block 402, a controller (e.g., controller 124) can operate a power conversion system (e.g., system 100) under a high power (HP) mode to supply relatively large amount of voltage to a load (e.g., load 156) connected to an output (e.g., output 144) of system 100. When the power conversion system is operating under high power mode in block 402, controller 124 can perform various functions to detect event occurrences for transitioning from high power mode into low power (LP) mode. In the example shown in FIG. 4, the controller can perform checks in blocks 406, 410, 414.

At block 406, the controller can receive a command (e.g., command 302) requesting the controller to operate the power conversion system under power states PS2, PS3 (see FIG. 3). In response to receiving the command at block 406, the controller can check whether the PMIC (e.g., PMIC 102) for low power mode is hot or not, such as determining wither an ambient temperature of the PMIC is greater than a predefined threshold or not. If the controller received the command requesting power states PS2 or PS3, and detect that the PMIC is hot, then process 400 can return to block 402 (406:FALSE). If the controller received the command requesting power states PS2 or PS3, and detect that the PMIC is not hot, then process 400 can proceed to block 418 (406: TRUE).

At block 418, the controller can preform a gradual phase drop to drop or deactivate phases in external power module 106 one at a time while prioritizing adding phases in response to increasing power demand by the load. By way of example, if phases Phase 1, Phase 2, Phase 3 are activated in block 402, then at block 418, the controller can drop Phase 3 in a first cycle. After the first cycle and at the beginning of a second cycle, if the power demand by the load remains the same or is reduced, then the controller can drop Phase 2 such that the power conversion system operates in a 1-PH mode. On the other hand, after the first cycle and at the beginning of a second cycle, if the power demand by the load increases, then the controller can add or activate Phase 3 such that the power conversion system uses Phase 1, Phase 2, Phase 3 to accommodate the increased power demand. The controller can monitor the power demand cycle by cycle to add or drop phases until one phase remains activated to operate the power conversion system under the 1-PH mode.

Process 400 can proceed from block 418 to block 422. At block 422, the controller can monitor the output voltage Vout (e.g., via voltage sensing circuit 142) to determine whether the power conversion system is operating under power state PS2 or PS3. Power conversion system not operating under power stage PS2 or PS3 can indicate that while waiting for 1-PH mode to occur in block 418, events could have occurred that put the power conversion system back into power states PS0 or PS1 categorized under high power mode. Therefore, if power conversion system is not operating under power state PS2 or PS3 in block 422, process 400 can return to block 402 (422: FALSE). If power conversion system is operating under power state PS2 or PS3 in block 422, process 400 can proceed to block 426 (422: TRUE).

At Block 426, the controller can determine whether the power conversion system is operating under the 1-PH mode for a predefined timer. The duration of the predefined timer can be arbitrary, such as being five microseconds (µs). If the power conversion system operates under the 1-PH mode for less than the duration of the predefined time (e.g., 5 µs) and at least one phase is added by the controller, then the controller can determine that the power conversion system is unstable. In response to determining that the power conversion system is unstable, process 400 can return to block 418 (426: FALSE). If the power conversion system operates under the 1-PH mode for the duration of the predefined time (e.g., 5 µs), then the controller can determine that the power conversion system is stable after entering the 1-PH mode. In response to determining that the power conversion system is stable, process 400 can proceed to block 434 (426: TRUE).

At block 434, the controller can deactivate all phases in external power module 106 and activate power stage 132 in PMIC 102 to transition from high power mode into low power mode.

At block 410, the controller can receive a command (e.g., command 302) requesting the controller to operate the power conversion system under a decay mode. In response to receiving the command at block 406, the controller can check whether the PMIC (e.g., PMIC 102) is hot or not. If the controller received the command requesting decay mode and the PMIC is hot, then process 400 can proceed to block 418 where the controller can drop one phase at a time while prioritizing adding phases to accommodate increasing power demand (410:FALSE). If the controller received the command requesting decay mode and the PMIC is not hot, then process 400 can proceed to block 430 (410:TRUE).

At block 430, the controller can operate the power conversion system under decay mode. Under decay mode, the controller can drop all phases (at the same time) in external power module 106 except for one phase to go in into 1-PH mode. In an embodiment, the gradual drop of phases in block 418 can be a slow path to drop phases while the instant drop of phases in block 430 is a fast path that allows the power conversion system to instantly enter discontinuous conduction mode (DCM). In an aspect, the decay mode is for the load to decay an output capacitor connected between the output inductors and the load at a relatively slow rate. The slow path in block 418 may not be able to achieve the slow decay while the fast path in block 430 can allow the controller to fulfill the decay mode request. After dropping all phases except for one phase, the power conversion system can enter the 1-PH mode and process 400 can proceed from block 430 to block 434, where the controller can operate the power conversion system in low power mode.

At block 414, the controller can receive a command (e.g., command 302) requesting the controller to operate the power conversion system under the 1-PH mode. In one embodiment, a request for the 1-PH mode can be made to the controller under a situation where the switching frequency of external power module 106 (e.g., high power mode in block 402) falls behind a certain number of system clocks. In response to receiving the command at block 406, the controller can check whether the PMIC (e.g., PMIC 102) is hot or not. If the controller received the command requesting the1-PH mode and the PMIC is hot, then process 400 can return to block 402 (414:FALSE). If the controller received the command requesting 1-PH mode and the PMIC is not hot, then process 400 can proceed to block 434, where the controller can operate the power conversion system in low power mode (414:TRUE).

At block 434, the controller can activate power stage 132 in PMIC 102 and switch the switches Q1, Q2 in power stage 132 to operate the power conversion system under low power mode. In one embodiment, to improve efficiency of the power conversion system under the low power mode, the controller can operate switches Q1, Q2 under a specific control scheme where the ON time of the switches Q1, Q2 may be limited by positive-current-limit on each switching cycle and the low side (e.g., Q2) ON time is extended to maintain a desired duty cycle. The specific control scheme can gear the operation of the power conversion system towards DCM or a slower switching frequency, which can result in additional efficiency gains when the dominant losses are gate current and output capacitance. Further, the specific control scheme can be triggered when the low power mode enters DCM or can be triggered any time during low power mode.

When the controller operates the power conversion system under low power mode, the controller can continue to monitor various aspects of the power conversion system to determine whether operation needs to transition back to high power mode. In one embodiment, the controller can monitor for flags from current sensing circuit 146. In one embodiment, current sensing circuit 146 can implement inductor DC resistance (DCR) current sensing where the parasitic resistance of the inductor winding is used for measuring inductor current of inductor 140. The DCR current can be relatively small for high power mode but can be relatively large for low power mode. Current sensing circuit 146 can include an analog attenuator to scale the DCR current to generate current information suitable for the different modes (e.g., high power mode and low power mode) while the unattenuated DCR current can still be used by the controller to for current limiting applications. Also, the current sensing circuit 146 being integrated with controller 124 and power stage 132 in PMIC 102 can allow for integrated current sensing mechanism that provides improved accuracy for load-line or current limiting.

In another embodiment, under low power mode, process 400 can proceed to block 438. At block 438, the controller can receive commands (e.g., from host computer 104) requesting high power mode (e.g., requesting power states PS0, PS1), requesting a system shut down (e.g., power state PS4), and/or requesting transition to high power mode due to the PMIC being hot. If the controller does not receive commands or requests to transition into high power mode or to shut down the power conversion system, process 400 can return to block 434 to continue the low power mode operation (438: FALSE). If the controller receives commands or requests to transition into high power mode or to shut down the power conversion system, process 400 can proceed to block 442 (438: TRUE).

At block 442, the controller can set a force continuous conducting mode (FCCM) of external power module 106 to a mid-level (e.g., tri-state) to begin a wake-up process of external power module 106. Further, at block 442, the controller can determine whether the Vout being outputted by power stage 132 (e.g., via voltage sensing circuit 142) corresponds to power state PS2 or PS3. By way of example, in block 442, Vout being outputted by power stage 132 corresponding to power state PS2 can indicate that external power module 106 may not need to wait to ramp up its output voltage to completely wake up process. Vout being outputted by power stage 132 corresponding to power state PS3 can indicate that external power module 106 may need to wait for a predefined wake-up time to lapse to completely wake up. If the Vout being outputted by power stage 132 corresponds to power state PS2, process 400 can proceed to block 454 after the controller sets external power module 106 to the FCCM (442: FALSE). If the Vout being outputted by power stage 132 corresponds to power state PS3, process 400 can proceed to block 446 after the controller sets external power module 106 to the FCCM (442: TRUE). The wait for the lapse of the predefine wake-up time before deactivating power stage 132 (before exiting low power mode) can prevent interruption to the power supply being provided to the load. The predefined wake-up time can be arbitrary. In one embodiment, the predefined wake-up time can be 5 μs.

If external power module 106 is under the FCCM set in block 442 (442: TRUE), process 400 can proceed to block

446. At block 446, the controller can start a timer to wait for the predefined wake-up time to lapse. Process 400 can proceed from block 446 to block 450. At block 450, if the timer is not done, process 400 can return to block 446 (450: FALSE). If the timer is done in block 450, process 400 can proceed to block 454 (450: TRUE).

At block 454, the controller can start a return-to-zero timer. In an aspect, it is inefficient to turn off power stage 132 when there is positive inductor current (on inductor 140) because energy in the inductor can be thrown away in the Low Side FET body-diode. It may be more efficient to transfer the inductor current to the output while keeping low side FET (e.g., Q2) on until the inductor current goes to 0 (e.g., zero amps). Further, power stage 132 can be damaged when it is tri-stated (e.g., turned off) while there is still current flowing through the inductor driven by the power stage 132. To exit the low power mode, power stage 132 will eventually be tri-stated to stop delivering power. Therefore, at block 458, the controller can start the return-to-zero timer to ensure that the inductor current is driven to zero before tri-stating power stage 132. A duration of the return-to-zero timer can be arbitrary and programmable. The return-to-zero timer can allow the controller to wait for a predefine duration that provides ample time for the inductor current to be driven to zero before tri-stating power stage 132. The wait for the return-to-zero timer to lapse can prevent interruption to the power supply being provided to the load when transitioning back to high power mode, and also can prevent damages to power stage 132. PMIC 102 can continue to provide power to the load under the low power mode during the wake up process of external power module 106.

Process 400 can proceed from block 454 to block 458. At block 458, the controller can exit the low power mode and process 400 can return to block 402, where the controller can operate external power module 106, which is awaken, to operate the power conversion system under high power mode. Further, since inductor choices for the low power mode and the high power mode can be different (e.g., inductor 140 can have different size and/or inductance from inductors 170, 180), the controller can be configured to perform compensation specific to PMIC 102 when transitioning into low power mode and to perform compensation specific to external power module 106 when transitioning to high power mode. The compensation specific to different hardware for different power modes can prevent disturbance on output 144.

As shown in the present disclosure, process 400 can minimize the time when neither power stage 132 in PMIC 102 nor external power module 106 is delivering power. Process 400 can also prevent overlap operations of both power stage 132 in PMIC 102 and external power module 106. Overlap operations can be, for example, when both high side FETs (e.g., M1, Q1) or both low side FETs (e.g., Q2, M2) are on, which creates large output ripple, and also when one of high side FET (e.g., Q1 or M1) and the other low side FET (e.g., M2, or Q2) are on, which lowers efficiency as some power is not being delivered to the output.

FIG. 5 is a flow diagram illustrating a process 500 to implement cross power management integrated circuit in one embodiment. The process can include one or more operations, actions, or functions as illustrated by one or more of blocks shown in FIG. 5. Although illustrated as discrete blocks, various blocks can be divided into additional blocks, combined into fewer blocks, eliminated, performed in different order, or performed in parallel, depending on the desired implementation.

Process 500 can be performed by a controller in a power conversion system, such as controller 124 described herein. Process 500 can begin at block 502. At block 502, the controller can operate a power converter under a low power mode to convert an input voltage into an output voltage for supplying the output voltage at a first load current from a power management integrated circuit (PMIC) to a load.

Process 500 can proceed from block 502 to block 504. At block 504, the controller can transition the power converter from the low power mode to a high power mode by performing at least one of activating a tri-state mode of the PMIC prior to activating at least one phase among a plurality of phases in an external power module, where the external power module and the PMIC can be on separate chips, and operating the PMIC and the at least one phase of the external power module simultaneously.

Process 500 can proceed from block 504 to block 506. At block 506, the controller can operate the power converter under the high power mode to convert the input voltage into the output voltage for supplying the output voltage at a second load current from the external power module to the load, where the second load current can be less than the first load current.

Process 500 can proceed from block 506 to block 508. At block 508, the controller can transition the power converter from the high power mode to the low power mode by selectively deactivating phases among a plurality of phases in the external power module prior to activating a power stage in the PMIC to supply the output voltage to the load.

In one embodiment, the controller can determine that an ambient temperature of the PMIC is greater than a predefined temperature threshold. In response to determining that the ambient temperature of the PMIC is greater than the predefined temperature threshold, the controller can operate the power converter under the high power mode.

In one embodiment, the controller can selectively deactivate phases among the plurality of phases in the external power module by deactivating one phase at a time until the external power module operates under a one-phase mode. The one-phase mode can include one activated phase among the plurality of phases.

In one embodiment, the controller can selectively deactivate phases among the plurality of phases in the external power module by deactivating all but one activated phase among activated phases in the plurality of phases.

In one embodiment, the controller can transition from the high power mode to the low power mode by selectively deactivating phases among the plurality of phases in the external power module to operate the external power module under a one-phase mode. The one-phase mode can include one activated phase among the plurality of phases. The controller can determine that a duration in which the external power module remains operated under the one-phase mode exceeds a predefined timer. The controller can, in response to determining that the duration in which the external power module remains operated under the one-phase mode exceeds the predefined timer, activate the power stage in the PMIC and deactivate the one activated phase in the one-phase mode of the external power module.

In one embodiment, the controller can transition from the low power mode to the high power mode by activating a tri-state mode of the external power module, determining an inductor current of an output inductor connected to the power stage is driven to zero, and in response to determining that the inductor current of the output inductor connected to the power stage in the PMIC is driven to zero, deactivating the power stage in the PMIC.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The various embodiments were chosen and described in order to best explain the principles of the invention and the practical application, and to enable others of ordinary skill in the art to understand the invention for various embodiments with various modifications as are suited to the particular use contemplated.

What is claimed is:

1. A system comprising:

an external power module comprising a plurality of phases, wherein each one of the phases comprises a first power stage configured to convert an input voltage into an output voltage; and a power management integrated circuit (PMIC) comprising:

a second power stage configured to convert the input voltage into the output voltage; and a controller configured to:

operate the system in a high power mode to supply the output voltage at a first load current from the external power module to a load;

operate the system in a low power mode to supply the output voltage at a second load current from the PMIC to the load, wherein the second load current is less than the first load current;

transition from the high power mode to the low power mode by selectively deactivating phases among the plurality of phases in the external power module prior to activating the second power stage in the PMIC to supply the output voltage under the second load current; and transition from the low power mode to the high power mode by performing at least one of:

activate a tri-state mode of the PMIC prior to activating at least one phase among the plurality of phases in the external power module; and operate the PMIC and the at least one phase of the external power module simultaneously.

2. The system of claim 1, wherein the controller is configured to:

determine that an ambient temperature of the PMIC is greater than a predefined temperature threshold; and in response to determination that the ambient temperature of the PMIC is greater than the predefined temperature threshold, operate the system in the high power mode.

3. The system of claim 1, wherein to transition from the high power mode to the low power mode, the controller is configured to selectively deactivate phases among the plurality of phases in the external power module by deactivating one phase at a time until the external power module operates under a one-phase mode, wherein the one-phase mode comprises one activated phase among the plurality of phases.

4. The system of claim 1, wherein to transition from the high power mode to the low power mode, the controller is configured to selectively deactivate phases among the plurality of phases in the external power module by deactivating all but one activated phase among activated phases in the plurality of phases.

5. The system of claim 1, wherein to transition from the high power mode to the low power mode, the controller is configured to:

selectively deactivate phases among the plurality of phases in the external power module to operate the external power module under a one-phase mode, wherein the one-phase mode comprises one activated phase among the plurality of phases;

determine that a duration in which the external power module remains operated under the one-phase mode exceeds a predefined timer; and in response to determination that the duration in which the external power module remains operated under the one-phase mode exceeds the predefined timer, activate the second power stage in the PMIC and deactivate the one activated phase in the one-phase mode of the external power module.

6. The system of claim 1, wherein to transition from the low power mode to the high power mode, the controller is configured to:

activate a tri-state mode of the external power module;

determine an inductor current of an output inductor connected to the second power stage is driven to zero; and in response to determination that the inductor current of the output inductor connected to the second power stage is driven to zero, deactivate the second power stage in the PMIC.

7. The system of claim 6, wherein the controller is configured to determine the inductor current of the output inductor connected to the second power stage is driven to zero by determining a lapse of a predefined timer.

8. A semiconductor device comprising:

a first power stage configured to convert an input voltage into an output voltage; and a controller configured to:

perform power conversion in a low power mode to supply the output voltage at a first load current from the first power stage to a load;

perform power conversion in a high power mode to supply the output voltage at a second load current from an external power module to the load, wherein the external power module comprises a plurality of phases, each one of the phases comprises a second power stage configured to convert the input voltage into the output voltage, and the second load current is greater than the first load current;

transition from the high power mode to the low power mode by selectively deactivating phases among the plurality of phases in the external power module prior to activating the first power stage in the PMIC to supply the output voltage to the load; and transition from the low power mode to the high power mode by performing at least one of:

activate a tri-state mode of the PMIC prior to activating at least one phase among the plurality of phases in the external power module; and operate the PMIC and the at least one phase of the external power module simultaneously.

9. The semiconductor device of claim 8, wherein the controller is configured to:

determine that an ambient temperature of the PMIC is greater than a predefined temperature threshold; and in response to determination that the ambient temperature of the PMIC is greater than the predefined temperature threshold, perform the power conversion in the high power mode.

10. The semiconductor device of claim 8, wherein to transition from the high power mode to the low power mode, the controller is configured to selectively deactivate phases among the plurality of phases in the external power module by deactivating one phase at a time until the external power module operates under a one-phase mode, wherein the one-phase mode comprises one activated phase among the plurality of phases.

11. The semiconductor device of claim 8, wherein to transition from the high power mode to the low power mode, the controller is configured to selectively deactivate phases among the plurality of phases in the external power module by deactivating all but one activated phase among activated phases in the plurality of phases.

12. The semiconductor device of claim 8, wherein to transition from the high power mode to the low power mode, the controller is configured to:

selectively deactivate phases among the plurality of phases in the external power module to operate the external power module under a one-phase mode, wherein the one-phase mode comprises one activated phase among the plurality of phases;

determine that a duration in which the external power module remains operated under the one-phase mode exceeds a predefined timer; and in response to determination that the duration in which the external power module remains operated under the one-phase mode exceeds the predefined timer, activate the first power stage in the PMIC and deactivate the one activated phase in the one-phase mode of the external power module.

13. The semiconductor device of claim 8, wherein to transition from the low power mode to the high power mode, the controller is configured to:

activate a tri-state mode of the external power module;

determine an inductor current of an output inductor connected to the first power stage is driven to zero; and in response to determination that the inductor current of the output inductor connected to the first power stage is driven to zero, deactivate the first power stage in the PMIC.

14. The semiconductor device of claim 13, wherein the controller is configured to determine the inductor current of the output inductor connected to the first power stage is driven to zero by determining a lapse of a predefined timer.

15. A method comprising:

operating a power converter under a low power mode to convert an input voltage into an output voltage for supplying the output voltage at a first load current from a power management integrated circuit (PMIC) to a load;

transitioning the power converter from the low power mode to a high power mode by performing at least one of:

activating a tri-state mode of the PMIC prior to activating at least one phase among a plurality of phases in an external power module, wherein the external power module and the PMIC are on separate chips; and operating the PMIC and the at least one phase of the external power module simultaneously;

operating the power converter under the high power mode to convert the input voltage into the output voltage for supplying the output voltage at a second load current from the external power module to the load, wherein the second load current is greater than the first load current; and transitioning the power converter from the high power mode to the low power mode by selectively deactivating phases among a plurality of phases in the external power module prior to activating a power stage in the PMIC to supply the output voltage to the load.

16. The method of claim 15, further comprising:

determining that an ambient temperature of the PMIC is greater than a predefined temperature threshold; and in response to determining that the ambient temperature of the PMIC is greater than the predefined temperature threshold, operating the power converter under the high power mode.

17. The method of claim 15, wherein selectively deactivate phases among the plurality of phases in the external power module comprises deactivating one phase at a time until the external power module operates under a one-phase mode, wherein the one-phase mode comprises one activated phase among the plurality of phases.

18. The method of claim 15, wherein selectively deactivate phases among the plurality of phases in the external power module comprises deactivating all but one activated phase among activated phases in the plurality of phases.

19. The method of claim 15, wherein transitioning from the high power mode to the low power mode comprises:

selectively deactivating phases among the plurality of phases in the external power module to operate the external power module under a one-phase mode, wherein the one-phase mode comprises one activated phase among the plurality of phases;

determining that a duration in which the external power module remains operated under the one-phase mode exceeds a predefined timer; and in response to determining that the duration in which the external power module remains operated under the one-phase mode exceeds the predefined timer, activating the power stage in the PMIC and deactivate the one activated phase in the one-phase mode of the external power module.

20. The method of claim 15, wherein transitioning from the low power mode to the high power mode comprises:

activating a tri-state mode of the external power module;

determining an inductor current of an output inductor connected to the power stage is driven to zero; and in response to determining that the inductor current of the output inductor connected to the power stage in the PMIC is driven to zero, deactivating the power stage in the PMIC.

* * * * *